Dec. 22, 1936.   C. E. HUDDLESTON ET AL   2,065,135
JARRING TOOL
Filed March 22, 1927
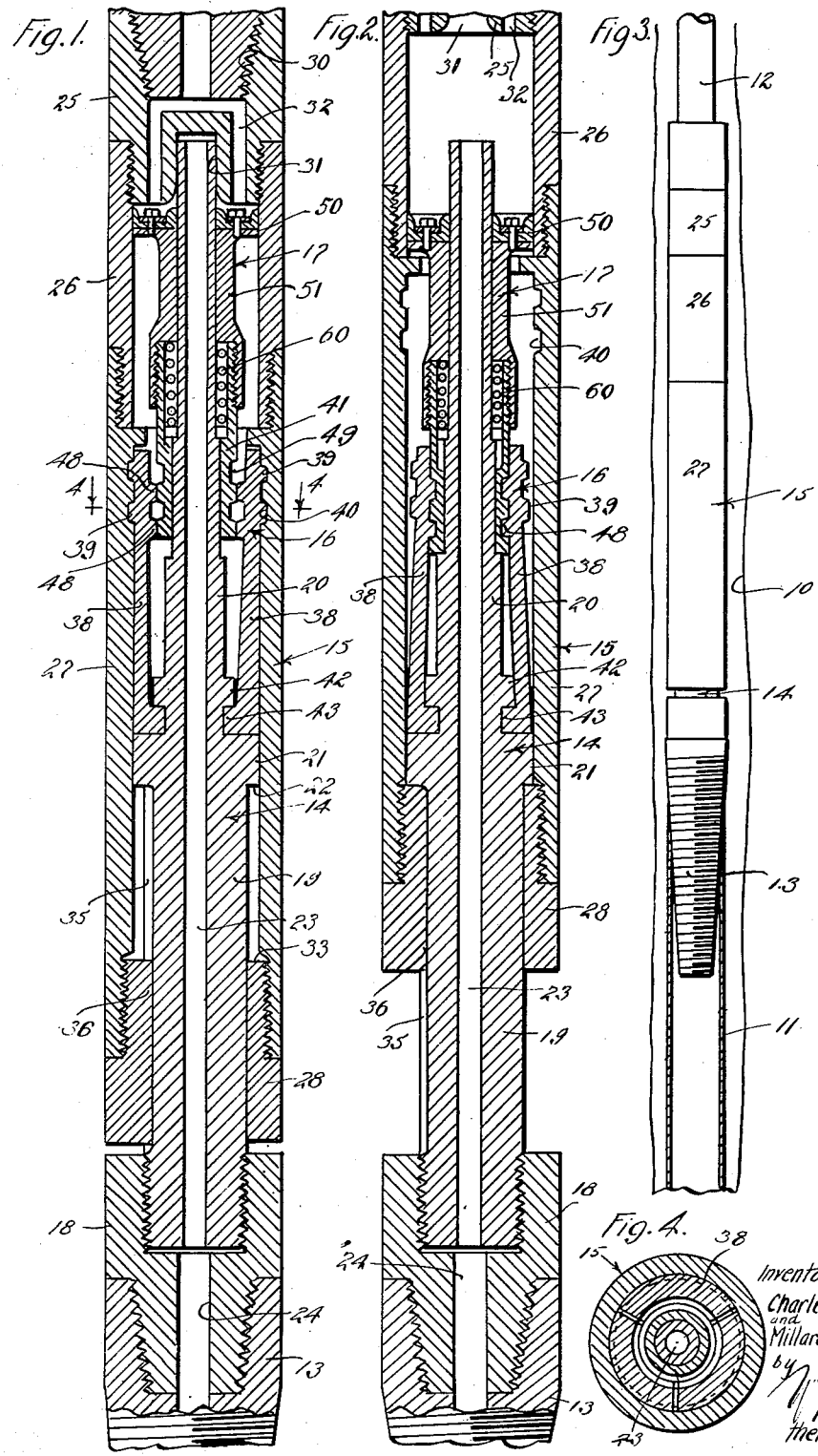
Inventors
Charles E. Huddleston
and
Millard Sumter Black
by *M H Caldwell*
their Attorney Patented Dec. 22, 1936

2,065,135

UNITED STATES PATENT OFFICE 2,065,135

JARRING TOOL

Charles E. Huddleston, Fullerton, and Millard Sumter Black, Huntington Park, Calif.; Julia S. Huddleston, administratrix of said Charles E. Huddleston, deceased, assignors to William H. Maxwell, Beverly Hills, Calif.

Application March 22, 1927, Serial No. 177,320

9 Claims. (Cl. 255—27)

This invention has to do with an oil well tool and has particular reference to a jar for operation in oil wells.

During the drilling or operation of an oil well, it occasionally becomes necessary to impart a jarring or hammering action to a member or object located in the well. A jarring or hammering action such as we refer to is most frequently required in removing or fishing an object from a well.

It has been found practical to obtain a jarring action in a well by putting a strain, for instance, a tensile strain on the operating member and then suddenly releasing one end of the member so that it is free to move. For instance, it is now common practice to impart a jar to a fishing tool by putting an up-strain on the string of drill pipe or casing used as the operating member until it has stretched a certain amount, and then releasing the strain by a rotation of the operating member to disengage co-operating shoulders at the lower end of the operating member, allowing the lower end of the operating member to move upwardly and impart a jar to the parts linked or loosely connected to it.

It is an object of this invention to provide a device for use in connection with an operating member such as a string of drill pipe, or the like, operable to release the lower end of the operating member when the member is under strain to impart a jar to a part connected to the operating member.

It is an object of this invention to provide a device of the general character above mentioned which is controlled hydraulically and does not require the rotation of the operating member as has been necessary in the devices heretofore proposed.

The various objects and features of this invention will be best and more fully understood from the following detailed description of a typical preferred form and application of the invention, throughout which description reference is had to the accompanying drawing, in which:

Fig. 1 is a longitudinal, detailed sectional view of the device showing it in position ready for operation;

Fig. 2 is a view similar to Fig. 1, showing the device operated;

Fig. 3 is a view illustrating a typical application of the invention or manner of using it in connection with a string of drill pipe and a typical fishing tool; and Fig. 4 is a detailed transverse sectional view, taken as indicated by line 4—4 on Fig. 1.

The present invention is useful, generally, in the drilling and operation of wells. It is, however, particularly useful and practical for use in connection with fishing tools. We will, therefore, proceed to describe our invention in a form and as applied to a fishing tool, it being understood that such reference is not to be construed as limiting or restricting the scope or range of application of the invention.

In the drawing, numeral 10 designates a well bore in which is located an object 11, to be removed therefrom, which object is in the form of a length of well casing. We have shown the tool or device provided by our present invention arranged in combination with an operating member or string of drill pipe 12, and a fishing tool 13. We have shown the fishing tool in the form of a tap attached by screw threads to the upper end of the well casing 11. With the present rotary method of drilling, it is customary to actuate fishing tools, and the like, by means of a string of drill pipe, so therefore, we have illustrated the operating member in the form of a string of drill pipe.

The device provided by this invention includes, generally, two sections 14 and 15, connected for limited movement relative to each other, means 16 for releasably holding the sections against relative movement, and means 17 operable to release the holding means.

The two sections 14 and 15 are adapted to form a connection between the operating member and fishing tool, one section being connected to the lower end of the operating member, and the other section to the upper end of the fishing tool. In the preferred form of the invention, one of the sections, for instance, the section 15, is tubular in form, while the other section 14 is in the form of a stem adapted to extend into the section 15. In the particular application of the invention shown in the drawing, the stem section 14 is attached to the upper end of the fishing tool 13, to project upwardly therefrom, while the section 15 is attached to the lower end of the operating member 12 to extend downwardly over the section 14.

The stem section 14 may be attached to the fishing tool in any suitable manner, for instance, through a suitable coupling member 18. We have shown the stem provided with a main part 19 which extends upwardly from the coupling 18 and an extension 20, which is smaller in diameter than the main part 19, and extends upwardly from or beyond the main part. The main part 19 is provided at its upper end with an enlargement or head 21 which presents a downwardly facing shoulder 22. The extension 20 of the stem carries parts of the means 16 and 17 as will be hereinafter described. An opening 23 is formed longitudinally through the stem section from the upper end of the extension 20 to the lower end of the main part 19 to conduct circulating fluid received from the tubular section 15 into the coupling 18 to pass through the opening 24 therein to the fishing tool.

The tubular section 15 comprises, generally, a coupling part 25, by which the section is attached to the lower end of the operating member, a cylinder part 26 which is attached to and extends downwardly from the coupling, a body part 27 extending downwardly from the lower end of the cylinder, and a head 28 attached to the lower end of the body part. The coupling part 25 of the section 15 is formed with a tapered screw threaded socket 30 to receive the pin section of a tool joint forming the lower end of the operating member. The coupling part 25 has a central socket 31 extending upwardly into it to slidably receive the upper end of the stem extension 20, when the sections are together or in the unactuated positions as shown in Fig. 1. Ports 32 are formed through the coupling member 25 to conduct fluid from the circulation opening in the operating member to the upper end of the cylinder 26.

The cylinder 26 is screw threaded onto the coupling part 25 to extend downwardly therefrom and is provided at its lower end with screw threads to receive the body part 27. The body part 27 is comparatively long and has its interior finished to slidably carry the head 21 of the stem section. The head 28 is screw threaded to the lower end of the body part 27 and slidably fits the main part 19 of the stem to present an upwardly facing shoulder 33 to co-operate with the shoulder 22 of the head 21 when the device is actuated. It is desirable to hold the two sections of the device against relative rotation. In practice, this may be done by forming longitudinal grooves 35 in the main part 19 of the stem section and projections 36 on the head 28 to slidably fit the grooves 35. This construction is clearly illustrated in Fig. 5, of the drawing.

The means 16 provided for releasably holding the sections 14 and 15 against relative longitudinal movement in the position shown in Fig. 1, includes one or more latch members 38 carried by the stem section 19 and provided with projections 39 adapted to fit or extend into recesses 40 formed in the inner wall of the body part 28 and a retaining member 41 arranged in connection with or behind the latch members 38. The latch members 38 may be connected with the extension 20 of the stem at the point of connection between the extension and the main part 19 of the stem. We have shown the lower ends of the latch members 38 fitting more or less closely between the extension 20 and the body part 27, and we have provided an annular projection 42 on the extension 20 to engage over inwardly extending parts 43 on the latch members to hold the latch members against longitudinal movement relative to the stem section. The projections 39 are formed on the outer sides of the latch members and at the outer end portions of the latch members. The projections 39 are made to more or less closely fit the annular recesses 40 provided in the inner wall of the body part 27. In Fig. 1, of the drawing, the projections 39 are shown in position in the recesses 40. The retaining member 41 is slidably carried on the extension 20 behind the outer end portions of the latch members and when positioned as shown in Fig. 1, it is in engagement with inwardly extending projections 48 on the outer end portions of the latch members, and operates to hold the latch members with the projections 39 in the recesses 40. The retaining member 41 is provided with recesses 49 which will receive the inwardly extending projections on the latch members upon the retaining member being moved longitudinally into position where the projections 48 and recesses 49 are opposite each other. Movement of the latch members 38 to allow the projections 48 to enter the recesses 49 causes the projections 39 to leave or move out of the recesses 40. In practice, the projections 39 and recesses 40 are shaped or related for instance, their edges are beveled as shown in the drawing, so that the latch members will move inwardly as soon as the recesses 49 are moved to position opposite the projections 48, when the tool is in operation as will be hereinafter described.

The means 17 provided for releasing the means 16 includes a piston 50 slidably fitting in the cylinder part 26 and around the stem extension 20. In the particular construction shown in the drawing, the upper end part of the retaining member 41 has a cap 51 screw threaded onto it and a spring 60 is arranged under compression between the stem extension 20 and the cap 51. The spring 60 operates to urge the retaining member 41 upwardly and normally holds it in the position where the retaining member engages the projections 48 as shown in Fig. 1, to hold the latch members out. The piston 50 is adapted to engage the cap to move the retaining member downwardly. With the construction just described, downward movement of the piston 50 causes corresponding movement of the retaining member 41 until the retaining member reaches a position where the projections 48 move into the recesses 49. The piston 50 is operated or moved downwardly by applying pressure to the fluid standing in the operating member or drill pipe 12, which pressure is communicated to the top of the piston through the ports 42. When the pressure is relieved from the top of the piston the spring 60 tends to return the retaining member 41 and the projections 48 and recesses 49 are related, for instance, their edges pitched so that the projections 48 move out of the recesses 49 upon the recesses 40 being moved into position or to receive the projections 39 on the outside of the latch members. In operation, the fishing tool is applied to the object to be removed from the well by rotation of the operating member and when it is desired to jar the fishing tool, operation is started with the parts in the position shown in Fig. 1. An up strain is put upon the operating member so that there is considerable pressure tending to move the section 15 upwardly relative to the stem section 14. When the desired strain has thus been placed on the tool, pressure is applied to the fluid in the operating member or string of drill pipe causing the piston to move downwardly and the retaining member 41 to be moved to position where the recesses 49 will receive the projections 48. The strain on the parts causes a tendency for the projections 39 to move out of the recesses 40 so therefore, when the recesses 49 come opposite the projections 48, the latch members move inwardly, thus releasing the section 15, allowing it to move up until the shoulder 33 of the head 28, engages the shoulder 22 of the head 21. The engagement of the shoulders causes a hammering or jarring action which is imparted to the fishing tool and the part connected therewith. In Fig. 2, the parts are shown in position with the shoulder 33 in engagement with the shoulder 22. If it is desired to impart another jar to the fishing tool, pressure is removed from the fluid in the drill pipe and the drill pipe is lowered until the recesses 40 come opposite the projections 39 whereupon the latch members, through the tendency to move outwardly caused by the spring 60, move outwardly, causing the projections 39 to again engage the recesses 40, and the retaining member 41 to again take position in engagement with the projections 49 to hold the latch members out. In practice, the parts are arranged and related so that the upper end of the stem extension 20 becomes removed from the socket 31 when the parts are actuated to the position shown in Fig. 2, so that circulating fluid passes through the stem section to the fishing tool and the pressure is automatically relieved from the top of the piston so that it can be returned by the action of the spring 60.

Having described only a typical preferred form of our invention, we do not wish to limit ourselves to the specific details set forth, but wish to reserve to ourselves any changes or variations that may appear to those skilled in the art, or fall within the scope of the following claims.

Having described our invention, we claim:

1. A jarring tool for use in connection with a hollow operating member including, two sections connected for relative longitudinal movement, one section being tubular and the other a stem section extending into the tubular section and having an opening longitudinally through it, jarring parts on the sections, means for releasably holding the sections against relative movement with said parts separated, and means for releasing the holding means, including a piston slidably fitting in the tubular section and having an opening slidably passing the stem section to be operable by fluid pressure applied through the operating member.

2. A jarring tool for use in connection with a hollow operating member including, two sections having jarring shoulders and connected for relative longitudinal movement, one section being tubular and the other a stem section extending into the tubular section and having an opening longitudinally through it, means for releasably holding the sections against relative movement with the shoulders apart, and means for releasing the holding means, including a piston slidably fitting in the tubular section and having an opening slidably passing the stem section to be operable by fluid pressure applied through the operating member, the tubular section having a part receiving the inner end of the stem section when the sections are held against movement thereby closing the end of the stem section.

3. A rotary hydraulic jar for operation by a drill string including a barrel, means for attaching the barrel to the drill string, a mandrel arranged within the barrel, means for connecting the mandrel with an object to be jarred, slips adapted to form a connection between said barrel and mandrel, means for retaining said slips in engagement with said barrel and mandrel, means for developing hydraulic pressure in the fluid in the drill string and jar for controlling the first mentioned means, and means for utilizing the stretch in the drill string to which the barrel is connected for imparting upwardly directed blows against said mandrel.

4. In a rotary hydraulic jar, a barrel provided with an internal shoulder, a series of segmental slips cooperating with said shoulder, a slip retainer positioned within said barrel to engage said slips, a mandrel arranged within said slip retainer and barrel, said mandrel being provided with a circumferential recess for the reception of said slips, there being a circulation duct through said mandrel, the lower portion of said mandrel being provided with a circumferential shoulder, and a jar subseated in the lower end of said barrel, the upper end of which jar sub is adapted to engage the shoulder on said mandrel.

5. In a rotary hydraulic jar, a barrel provided with an internal shoulder, a series of segmental slips to engage said shoulder, a slip retainer positioned within said barrel, a mandrel arranged within said slip retainer and barrel, there being a circulation duct through said mandrel, the lower portion of said mandrel being provided with a circumferential shoulder, a jar subseated in the lower end of said barrel, the upper end of which jar sub is adapted to engage the shoulder on said mandrel, a top subseated in the barrel and a flow pipe carried by the mandrel and projecting upwardly through the slip retainer into the chamber between said retainer and the top sub.

6. In a rotary hydraulic jar, a barrel, a mandrel arranged for operation within said barrel, a shoulder extending around the interior of said barrel, a shoulder extending around the exterior of said mandrel, and slips arranged between the shoulders on said mandrel and barrel.

7. In a rotary hydraulic jar, a barrel, a mandrel arranged for operation within said barrel, a shoulder extending around the interior of said barrel, a shoulder extending around the exterior of said mandrel, slips arranged between the shoulders on said mandrel and barrel, and pressure actuated means for retaining said slips against the shoulder on said barrel.

8. In a rotary hydraulic jar, a barrel provided on its inner wall with a shoulder, a series of slips for engaging said shoulder, a retainer for the slips operable within said barrel, a mandrel arranged within said retainer and barrel having a circumferential groove for receiving said slips, and fluid pressure actuated means for operating the slip retainer.

9. In a rotary hydraulic jar, a barrel provided with an internal shoulder, a series of slips for engaging said shoulder, a retainer for the slips operable within said barrel, a mandrel arranged within said slip retainer and barrel, said mandrel having a circumferential groove for receiving said slips, means operable by hydraulic pressure for actuating the slip retainer, a shoulder on the lower portion of said mandrel, and a member carried by the lower end of the barrel and adapted to engage the shoulder on said mandrel.

CHARLES E. HUDDLESTON.
M. SUMTER BLACK.